Figure 1:
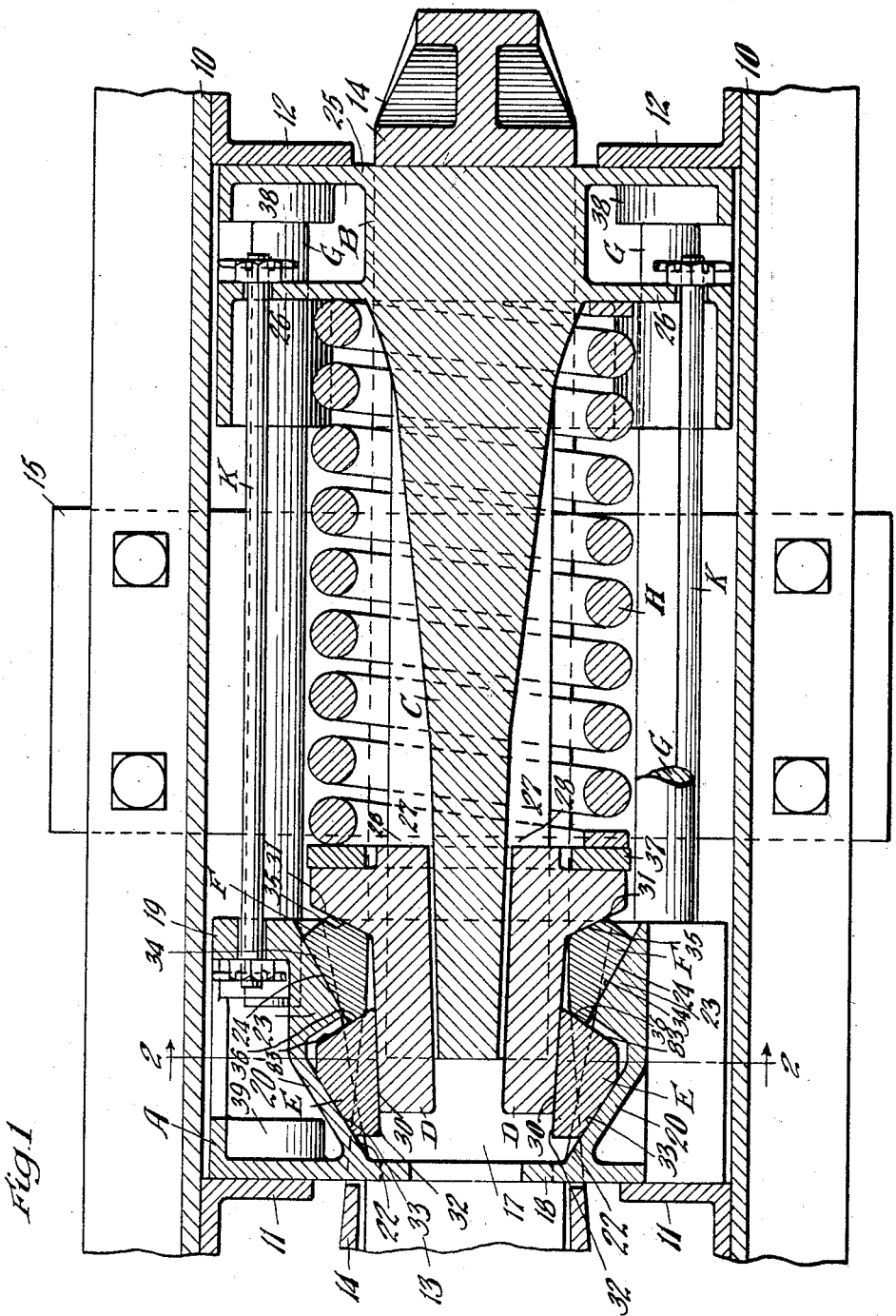

Oct. 18, 1932.     S. B. HASELTINE     1,882,838
FRICTION SHOCK ABSORBING MECHANISM
Original Filed Sept. 26, 1923   2 Sheets-Sheet 1

Witness
Wm. Geiger

Inventor
Stacy B. Haseltine
By Joseph Harris
His Atty.

Oct. 18, 1932.  S. B. HASELTINE  1,882,838
FRICTION SHOCK ABSORBING MECHANISM
Original Filed Sept. 26, 1923  2 Sheets-Sheet 2
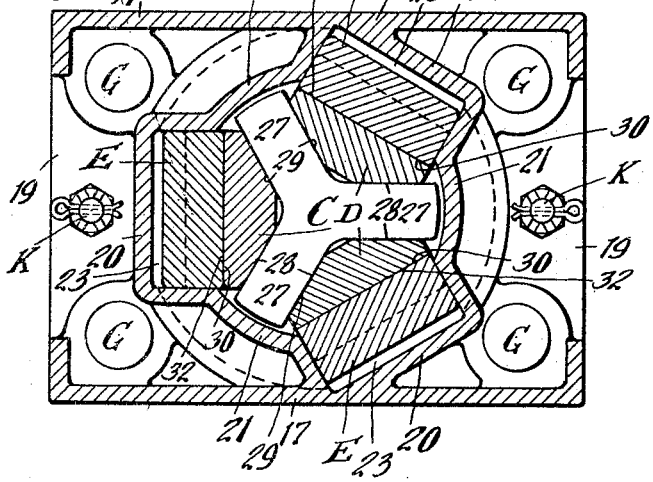
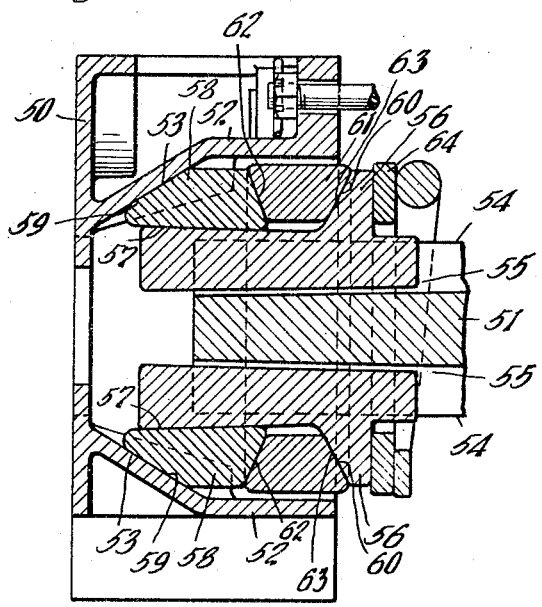
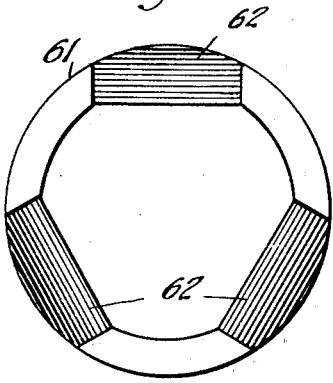

Patented Oct. 18, 1932

1,882,838

UNITED STATES PATENT OFFICE

STACY B. HASELTINE, OF CHICAGO, ILLINOIS, ASSIGNOR TO W. H. MINER, INC., OF CHICAGO, ILLINOIS, A CORPORATION OF DELAWARE

FRICTION SHOCK ABSORBING MECHANISM

Original application filed September 26, 1923, Serial No. 664,867. Divided and this application filed July 7, 1928. Serial No. 291,066.

This invention relates to improvements in friction shock absorbing mechanisms.

This application is a division of my co-pending application for friction shock absorbing mechanisms, Serial No. 664,867, filed September 26, 1923.

One object of the invention is to provide a friction shock absorbing mechanism including a central friction post, shoes having frictional engagement therewith, and a wedge pressure transmitting means, wherein is obtained high frictional capacity combined with assured release, the arrangement being such that a high frictional capacity is developed during the compression by a system of relatively blunt and keen angle wedge and friction elements cooperating with the friction shoes.

Other and further objects of the invention will more clearly appear from the description and claims hereinafter following.

In the drawings, forming a part of this specification, Figure 1 is a longitudinal, sectional view of a part of a railway draft rigging, illustrating my improvements in connection therewith, the section through the follower, friction elements and other parts corresponding to two section planes approximately 120° apart. Figure 2 is a vertical, transverse, sectional view, corresponding substantially to the line 2—2 of Figure 1. Figure 3 is a view similar to Figure 1 of the front end portion of the shock absorbing mechanism, illustrating a different embodiment of the invention. And Figure 4 is an elevational view of a wedge ring employed in connection with the embodiment of the invention illustrated in Figure 3.

In said drawings, 10—10 indicate the usual channel-shaped center or draft sills of the railway car underframe, to the inner faces of which are secured front stop lugs 11—11 and rear stop lugs 12—12 of usual construction. The inner end portion of the coupler shank is designated by 13, same having operatively connected thereto a hooded yoke 14 of well known form, within which is disposed a shock absorbing mechanism proper, hereinafter described. The yoke and the parts therewithin are supported by a detachable saddle plate 15 secured to the draft sills.

Referring first to the embodiment of the invention illustrated in Figures 1 and 2, the improved shock absorbing mechanism proper comprises a combined front follower and wedge casting A; a rear follower casting B; a friction post C; three friction shoes D—D; three wedge blocks E—E; three wedge blocks F—F; four stop members G—G; a main spring resistance H; and a pair of retainer bolts K.

The combined front follower and wedge casting A is of hollow construction and comprises a top wall 16 and a bottom wall 17; a front wall 18; a rear wall 19; and three longitudinally arranged walls 20—20 extending from the front wall 18 to the rear wall 19, the longitudinally extending walls 20 being connected by curved web portions 21—21 and defining a casing in which the wedge friction shoes are housed. As clearly shown in Figure 2, the walls 20 are arranged symmetrically about the axis of the gear and are provided at the front ends thereof with interior, rearwardly diverging flat wedge faces 22—22 extending at a relatively keen wedge acting angle with reference to the longitudinal axis of the mechanism.

Rearwardly of the wedge faces 22, the side walls 20 are inwardly enlarged, as indicated at 23, the enlarged sections 23 being each provided with a wedge face 24, also disposed at a relatively keen wedge acting angle with respect to the longitudinal axis of the mechanism. It will be evident that the combined follower casting and wedge member A is thus provided with three sets of keen wedge faces, the wedge faces of each set being arranged lengthwise of the mechanism. The end wall 18 of the member A is adapted to abut the front stop lugs 11 and cooperate therewith, in the manner of the usual front follower.

The rear follower casting B is of generally rectangular outline and has integrally formed therewith the friction post C. The follower B is provided with a rear wall 25, adapted to coact with the rear stop lugs 12 in the manner of the usual rear follower. Forwardly of the wall 25, the follower member B is provided with a web 26 laterally projecting from the rear end of the post C and extending parallel to the rear wall 25 of said follower. The friction post C is provided at the forward end thereof with three equally spaced, laterally projecting arms 27—27, thereby providing three longitudinally extending V-shaped friction surfaces 28—28, which diverge slightly in a direction toward the rear of the mechanism. The friction shoes D—D are of similar design, each having a V-shaped inner friction surface 29 adapted to cooperate with one of the V-shaped friction surfaces 28 of the post C. At the outer side, each friction shoe D is provided with a face 30, slightly inclined with respect to the longitudinal axis of the mechanism and adapted to form a longitudinally disposed flat friction surface. At the rear end portion beyond the surface 30, each friction shoe D is provided with a rearwardly and outwardly inclined face 31, extending at a relatively blunt angle with reference to the longitudinal axis of the mechanism.

The three wedge blocks E—E are of similar design and are adapted to cooperate respectively with the front end portions of the three friction shoes D. Each wedge block E is provided with a flat inner surface 32, adapted to engage the friction surface 30 of the corresponding friction shoe. At the forward end thereof, each block E is provided with a wedge face 33 engaging one of the wedge faces 22 of the wedge casing A. At the rear end, each block E is provided with a relatively blunt wedge face 83, adapted to cooperate with the front end of one of the wedge blocks F.

The three wedge blocks F are also of similar design and each block is provided with a wedge face 34 on the outer side thereof, adapted to cooperate with one of the wedge faces 24 of the front follower member A. At the inner end, each block F has a relatively blunt wedge face 35 engaging the blunt wedge face 31 of the corresponding friction shoe. At the forward end, each block F is provided with a relatively short blunt wedge face 36 which engages directly the rear wedge face 83 of the corresponding wedge block E. As most clearly shown in Figure 1, the wedge blocks F are spaced slightly from the friction surfaces 30 of the friction shoes D in the normal full release position of the parts.

The spring resistance H, which comprises a relatively large single coil, is interposed between the web 26 of the rear follower B and the friction shoes D, a spring follower ring 37 being interposed between the front end of the spring and the inner ends of the friction shoes. As shown in Figure 1, the friction shoes are circumferentially cut away at the inner ends to accommodate the spring follower ring 37, sufficient clearance being provided to permit the necessary lateral outward movement of the friction shoes, due to the tapered form of the friction post C.

The stop members G are four in number, extending longitudinally of the mechanism and are located at the corners of the followers, being suitably mounted between bosses 38—38 on the rear follower B and bosses 39—39 on the front follower A, and extending loosely through aligned recesses in the web 26 and the rear wall 19 of the follower A. The stop members G are of such a length that the front ends thereof are adapted to abut the bosses 39 of the front follower and the bosses 38 of the rear follower to limit the relative inward movement of the followers toward each other when the gear is fully compressed, thereby forming in effect stop columns by which the excess pressure is transmitted directly from the front follower to the rear follower.

The retainer bolts K are two in number, arranged in opposite sides of the gear midway of its height, each bolt having the rear end thereof anchored to the web 26 of the rear follower B and its front end anchored to the wall 19 of the front follower A.

The operation of the improved shock absorbing mechanism illustrated in Figures 1 and 2, assuming a compression stroke of the mechanism, is as follows: The front follower A and the rear follower B will be moved toward each other, thereby setting up a wedging action between the front follower and the wedge blocks E and F, forcing the latter against the friction shoes D. The shoes will thus be pressed tightly against the friction surfaces of the post C and also carried inwardly of the post, due to the inward movement of the follower A. During the inward movement of the shoes D, the main spring resistance H will be compressed and the shoes will be forced laterally apart, due to the taper of the post. During the lateral outward movement of the shoes, a differential action will be had, the wedge faces of the blocks E slipping on the wedge faces 22 of the follower A, sufficient clearance being provided between the inner ends of the blocks E and the enlargements 23 of the side walls of the follower A to accommodate the relative slipping movement of the wedge faces. As the blocks E slip on the wedge faces of the follower A, they will be forced inwardly of the mechanism with respect to the follower A. The shoes D, in their lateral outward movement, also slip on the wedge faces 35 at the inner ends of the blocks F and the blocks F, which are forced rearwardly by the slippage of the blocks E, will also slip on the wedge faces 24 of the follower A. Due to the differential action of the wedge blocks E and F, the entire friction wedge system will be longitudinally elongated thereby, additionally compressing the main spring resistance H. Inward movement of the front and rear followers toward each other will be limited by the stop members G, thereby relieving the main spring resistance from undue compression.

Upon removal of the compression force, the follower A will fall away from the wedge blocks E and F, thus relieving the pressure on the latter and the shoes D, permitting the spring resistance to restore all the parts to the normal full release position.

Referring next to the embodiment of the invention illustrated in Figures 3 and 4, the follower 50 and the post 51 are, except as hereinafter pointed out, similar to the follower A and the post C of the form of the invention hereinbefore described, the follower 50 being provided with three longitudinal walls 52—52 and three interior wedge faces 53—53, which are disposed at a relatively keen wedge acting angle with respect to the longitudinal axis of the mechanism. The post is also provided with three arms 54—54 and three rearwardly diverging V-shaped friction surfaces 55—55. Three friction shoes 56—56 cooperate with the post and have V-shaped friction surfaces which engage with the V-shaped friction surfaces 55. On the outer side, each shoe 56 is provided with a longitudinally disposed friction surface 57, which, as shown, is arranged at an angle to the inner friction surface of the corresponding shoe. The friction surfaces 57 of the three shoes preferably converge inwardly of the mechanism. Three wedge blocks 58—58 are interposed between the friction shoes and the wedge faces 53 of the follower 50. Each block 58 is provided with a friction surface on the inner side thereof, cooperating with the friction surface 57 of the corresponding shoe. At the front end, each block 58 is provided with a wedge face 59, disposed at a relatively keen wedge acting angle with respect to the longitudinal axis of the mechanism and cooperating with the corresponding wedge face 53 of the follower 50.

At the inner end, each shoe 56 is provided with a lateral enlargement having a relatively blunt wedge face 60 at the front side thereof. A wedge ring 61 is interposed between the inner ends of the blocks 58 and the enlargements 60 of the friction shoes, the wedge ring being provided with three sets of wedge faces 62 and 63 on the opposite sides thereof, adapted to cooperate respectively with the blocks 58 and the enlargements 60 of the shoes. The wedge faces 62 engage relatively blunt wedge faces at the inner ends of the blocks 58. The details of construction of the shock absorbing mechanism illustrated in Figures 3 and 4 otherwise corresponds in all respects to the construction shown in Figures 1 and 2, the same being provided with a rear follower on which the friction post is mounted and the followers being connected by retainer bolts and having stop members interposed therebetween for limiting the relative approach of the followers. A main spring resistance, similar to the spring resistance described in connection with Figures 1 and 2, is also employed and cooperates with a spring follower ring 64 bearing on the inner sides of the enlargements of the friction shoes.

The operation of the improved shock absorbing mechanism illustrated in Figures 3 and 4 is as follows: As the follower 50 moves inwardly, a wedging action is set up between the wedge faces 53 and 59 of the follower and the blocks 58, thereby forcing the blocks against the shoes 56 and pressing the shoes against the post. As the follower 50 moves inwardly, the wedge blocks 58 will force the wedge ring 61 rearwardly, the latter in turn, through engagement with the enlargements of the friction shoes, forcing the shoes rearwardly also.

As the shoes move rearwardly on the friction surfaces of the post, they will be gradually spread apart, due to the taper of the post forcing the wedge blocks outwardly also, thereby effecting a differential action, the faces 59 slipping on the faces 53 of the follower and the faces at the inner ends of the wedge blocks slipping on the wedge faces of the ring 61. The wedge faces 60 of the shoes at the same time will slip on the wedge faces 63 at the inner side of the ring. The shoes will thus be forced rearwardly relative to the follower 50 and the wedge blocks 58, slippage thus occurring between the engaged faces of the shoes and the blocks. Upon removal of the compression force, the follower 50 will drop away from the wedges 58, thus relieving the pressure on the latter and the shoes 56, permitting the spring resistance to restore all of the parts to the normal full release position.

While I have herein shown and described what I consider the preferred manner of carrying out my invention, the same is merely illustrative and I contemplate all changes and modifications which come within the scope of the claims appended hereto.

I claim:

1. In a friction shock absorbing mechanism, the combination with front and rear followers movable relatively toward and away from each other; of a tapered central friction post having exterior friction surfaces diverging inwardly of the mechanism; friction shoes cooperating with the post friction surfaces; a spring resistance; and a wedge system cooperating with the shoes, including a wedge pressure transmitting member and a plurality of sets of wedge blocks, each set including two blocks, each having wedging engagement with said wedge pressure transmitting member, one of said blocks having frictional engagement with one of the shoes and the other of said blocks having wedging engagement with said shoe.

2. In a friction shock absorbing mechanism, the combination with front and rear followers movable relatively toward and away from each other; of a tapered central friction post having exterior friction surfaces diverging inwardly of the mechanism; friction shoes cooperating with the post friction surfaces; a spring resistance; and a wedge system cooperating with the shoes, including a wedge pressure transmitting member and a plurality of sets of wedge blocks, each set including a pair of blocks having cooperating wedge faces, said pair of blocks both engaging one of said shoes and the blocks of each pair having wedging engagement with the wedge pressure transmitting member.

3. In a friction shock absorbing mechanism, the combination with a tapered friction post; of a wedge casing, said post and casing being relatively movable toward and away from each other, said casing having a plurality of sets of interior wedge faces; a plurality of friction shoes having frictional engagement with the post; a main spring resistance opposing relative movement of the shoes and post; and a set of wedge blocks engaging each shoe, the wedge blocks of said set having wedging engagement respectively with one of said sets of wedge faces of the casing.

4. In a friction shock absorbing mechanism, the combination with a tapered friction post; of a wedge casing, said post and casing being relatively movable toward and away from each other, said casing having a plurality of sets of interior wedge faces; a plurality of friction shoes having engagement with the post; a main spring resistance opposing relative movement of the shoes and post; and a set of wedge blocks cooperating with each shoe, one of the wedge blocks of said set having frictional engagement with the shoe and the other wedge block of said set having wedging engagement with said shoe, said blocks having wedging engagement with each other and wedging engagement with the respective wedge faces of one of said sets of the casing.

5. In a friction shock absorbing mechanism, the combination with front and rear followers relatively movable toward and away from each other; of a tapered central friction post having exterior friction surfaces diverging inwardly of the mechanism; friction shoes cooperating with the post friction surfaces; a spring resistance; and a wedge system cooperating with the shoes, including a wedge pressure transmitting member and a plurality of sets of wedge blocks, each set including two blocks, each having wedging engagement with said wedge pressure transmitting member along faces inclined at a relatively keen angle with respect to the longitudinal axis of the mechanism, one of said blocks having frictional engagement with one of the shoes and the other of said blocks having wedging engagement with said shoe along faces inclined at an angle to the longitudinal axis greater than the angle of the cooperating faces of said block and pressure-transmitting member.

6. In a friction shock absorbing mechanism, the combination with front and rear followers; of a tapered central friction post movable with one of said followers, said post having exterior friction surfaces diverging inwardly of the mechanism; friction shoes cooperating with the post friction surfaces; a main spring resistance; and a wedge system cooperating with the shoes, including a wedge pressure transmitting member and a plurality of sets of wedge blocks, each set including a pair of blocks having cooperating wedge faces inclined with respect to the longitudinal axis of the mechanism at a relatively blunt angle, said pair of blocks both engaging one of said shoes, one of said blocks having frictional engagement with the shoe and the other having wedging engagement with said shoe on faces inclined at a relatively blunt angle with respect to the longitudinal axis of the mechanism, said blocks of each pair having wedging engagement with the wedge pressure transmitting member along faces inclined at an angle to said longitudinal axis which is less than the inclination of said first and second named cooperating wedge faces.

In witness that I claim the foregoing I have hereunto subscribed my name this 5th day of July 1928.

STACY B. HASELTINE.